July 5, 1966  O. J. BRATZ  3,258,990
PUSH-PULL CABLE
Filed Jan. 20, 1964  2 Sheets-Sheet 2

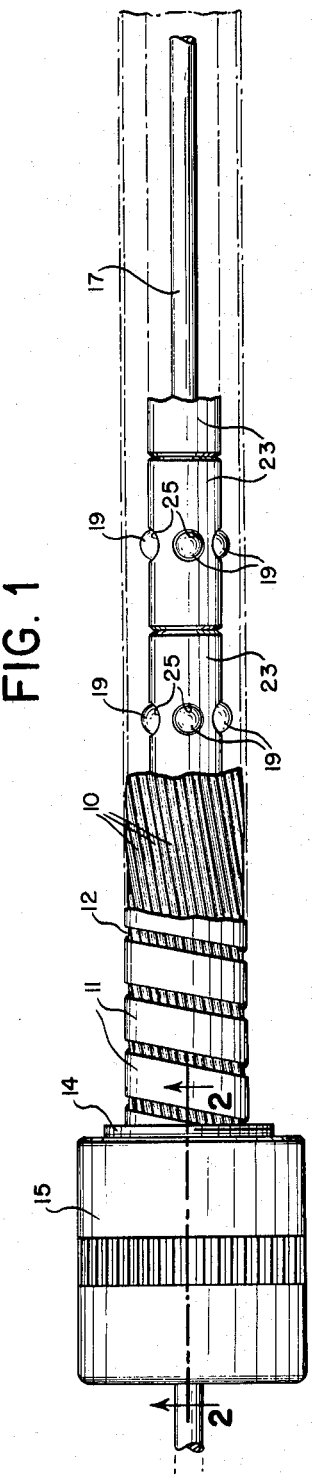
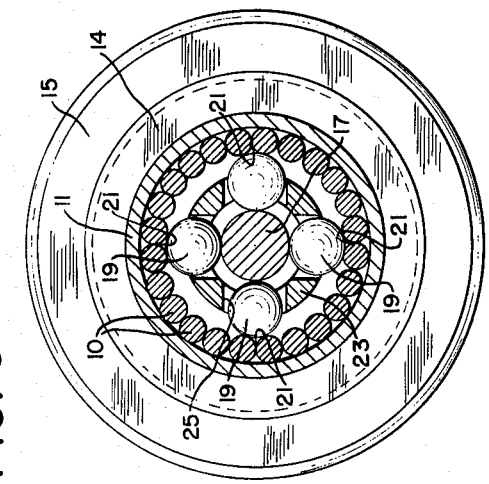
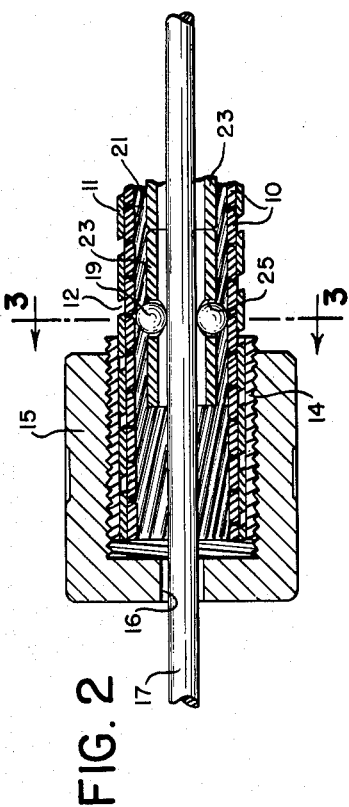

INVENTOR.
OTTO J. BRATZ
BY
ATTORNEYS

United States Patent Office 3,258,990
Patented July 5, 1966

3,258,990
PUSH-PULL CABLE
Otto J. Bratz, Adrian, Mich., assignor to American Chain & Cable Company, Inc., New York, N.Y., a corporation of New York
Filed Jan. 20, 1964, Ser. No. 338,955
5 Claims. (Cl. 74—501)

This invention relates to push-pull cables and in particular to a ball-bearing push-pull cable having a casing formed from a multiplicity of helically disposed strands which are bound side-by-side in tubular form to form helical bearing races on the bore of the casing. This application is a continuation-in-part of my copending application Serial No. 103,747, filed April 18, 1961, now Patent No. 3,135,132.

In general, the improvement in the new push-pull cable design is based upon an economical and highly effective cable casing or housing constructed by helically wrapping together a multiplicity of strands side-by-side and binding them in place by means of a flexible exterior element. Preferably, this is done on a mandrel and the exterior binding element is swaged against the strands. When the bound strands are removed from the mandrel they retain their tubular form and a self-supporting casing results which is especially suited for use in ball-bearing push-pull cables. Such a tubular casing does not necessarily rely upon any particular cross sectional configuration of the individual strands to be self-supporting because the helical disposition of the strands and the substantially radial forces exerted thereon by the exterior binding prevent the strands from being displaced out of their tubular form. It is particularly contemplated by the invention that the strands be wrapped in a helix of relatively long pitch or lay in order to provide a sound self-supporting tubular structure.

One of the most important features of the new push-pull cable casing is that it can be bent in any direction during operation and still function satisfactorily. Because of the helical arrangement of the strands in the casing, it possesses good flexibility and thus can be made to assume various curved shapes with little effort. Even more significantly, however, when the casing is bent into a curved shape its neutral axis does not undergo critical lateral displacement. This is of particularly great importance in a ball-bearing push-pull cable because the axially movable core element should coincide with the neutral axis of the casing for proper bearing action and it cannot do so if the neutral axis is not coincidental with the geometric axis.

On the inside surface of the casing, the extended helical zones between pairs of the strands provide highly satisfactory races for bearing balls disposed about a central core element. Adjoining or adjacent pairs of most wires define a valley betwen them and such valleys provide the races in the new casing. Hence, the new casing eliminates the need for separate race elements. Also, the helical disposition of the races formed by the valleys between pairs of the strands imparts a novel turning motion to the bearing cages as they move axially within the cable. The bearing balls therefore move helically when the core element is displaced and their over-all longitudinal displacement is less for a given displacement of the core element than it would if they were made to roll in a straight line longitudinally.

Broadly stated, the environment of the invention is a push-pull cable comprising a casing and a core element axially translatable therewithin in rolling engagement with a plurality of bearing balls inside the casing. The improvement comprises a multiplicity of helically disposed wires bound together side-by-side throughout their length and defining the inner bore of the casing. A plurality of helical bearing races are formed throughout the length of the bore of the casing by the wires. The bearing balls in rolling engagement with the core element are also in rolling engagement with certain of these helical bearing races so that the bearing balls roll in helical path as the core element is translated within the casing. The casing wires may be round so that the races are formed by adjoining pairs of the wires, or every other one of the casing wires may have a cross section differing from that of the neighboring pairs of wires to each side of it so that the races are formed by the neighboring pairs of wires.

The invention also contemplates improved cage means for spacing the bearing balls of the push pull cable. This cage means comprises a plurality of separate cylindrical cages and spacers disposed loosely about the core element within the inner bore of the casing. Each of the cages is formed with circumferentially spaced holes in which bearing balls are loosely located. The adjoining ends of the cages and spacers are of mating concave and convex shapes to permit of angular movement between them without substantial displacement of their neutral bending and geometric axes.

Preferred embodiments of the invention are described hereinbelow with reference to the accompanying drawing, wherein FIG. 1 is a fragmentary elevation partly broken away of the end portion of one form of the new push-pull cable;

FIG. 2 is a section taken along the line 2—2 of FIG. 1;

FIG. 3 is an enlarged section taken along the line 3—3 of FIG. 2;

Figures 4, 5:
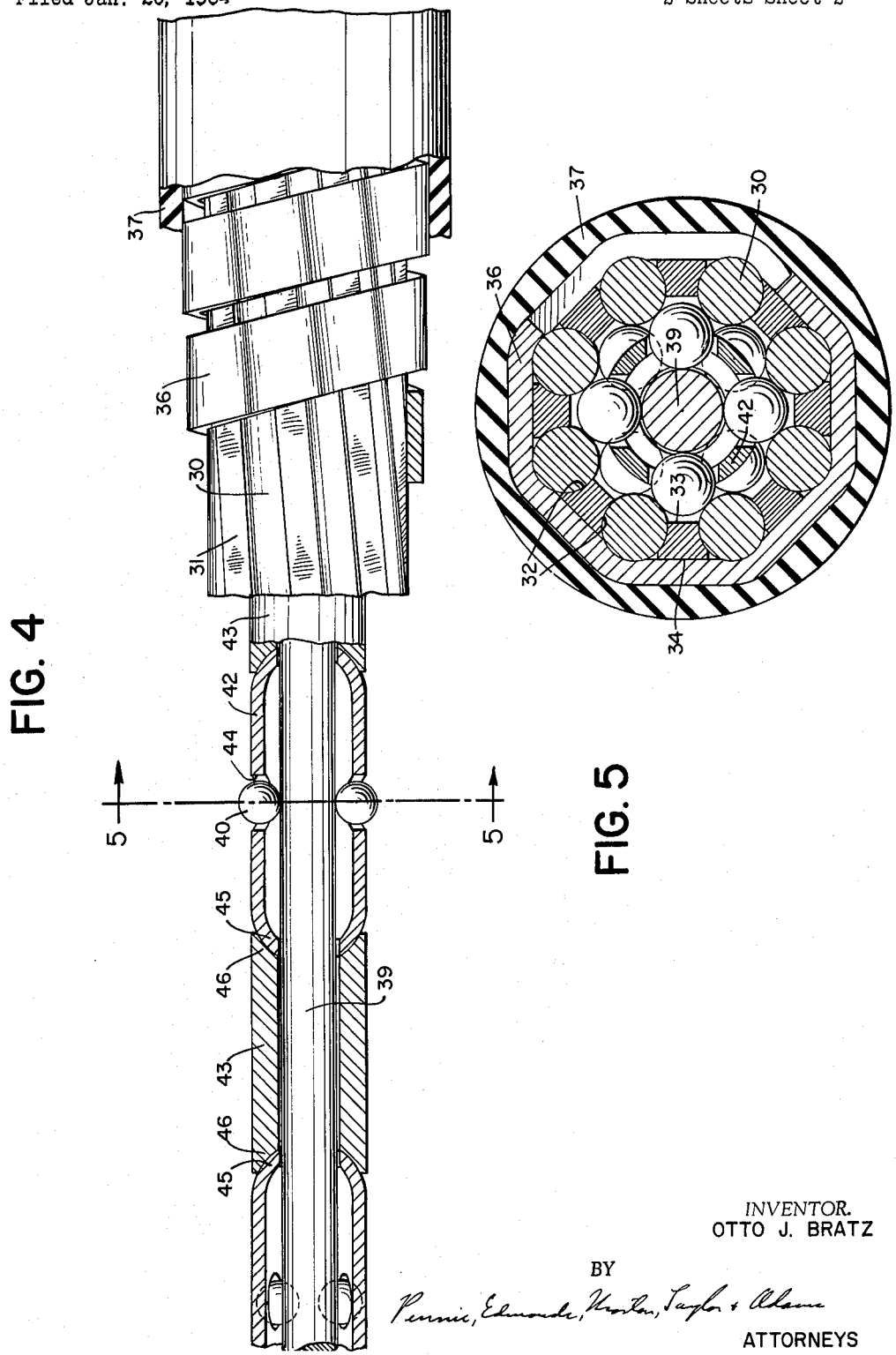
FIG. 4 is a fragmentary longitudinal elevation partly broken away of another form of the new push-pull cable.
FIG. 5 is a section taken along the line 5—5 of FIG. 1.

In FIGS. 1 to 3, the new casing is made up of a multiplicity of round wires 10 held in place by an outer flexible metal strip 11. In a preferred method of fabrication, the wires 10 are originally straight (i.e. not preformed into helical configuration) and they are wrapped side-by-side about a mandrel in a helical form having a lay at least fifteen times greater than the outer diameter of the wrapping. The strip 11 is then applied tightly about the wires in helical turns of a lesser lay and a space 12 is left between the turns of the strip 11. Before the assembly is removed from the mandrel, the strip 11 is continuously swaged against the wires 10 to insure that it binds them firmly. When the bound wires are removed (and they may be withdrawn continuously from the mandrel) a self-supporting tubular structure results.

Any suitable end fitting may be provided on the opposite ends of the casing. That shown is an externally threaded collar 14 crimped about the strip 11 at the cable end portion and an internally threaded cap 15 screwed on the collar. A central circular opening 16 is provided in the outer end of the cap 15. Both ends of the cable may be equipped with such a fitting.

By this form of the new construction, a casing is provided which is a firmly self-supporting structure readily flexible in any direction. Because of the helical pitch of the wires 10, they remain held in their tubular form by the strip 11 regardless of the cross sectional shape of the wires. Hence, round wires may be employed and there is no need to incorporate trapezoidal strands which hold together only by the keystone principle. Because of the long lay of the wires 10 and the spacing 12 between the turns of the strip 11, the casing may be flexed without causing substantial lateral displacement of its neutral axis.

Extending substantially axially throughout the length of the casing is a core element 17 which may be a heavy flexible round wire possessing sufficient stiffness to transmit forces in compression without buckling. The core element 17 projects loosely through the opening 16 in the fittings 15 at each end of the casing. When the cable is installed, the core element 17 is linked to the appropriate actuator and driven member at its opposite ends.

Disposed in rolling engagement with the surface of the core element 17 are a multiplicity of bearing balls 19 having a diameter such that they are also in rolling engagement with the inside surface of the casing and thereby hold the core element axially within the cable. The inside surface of the casing is defined by a multiplicity of valleys between adjoining pairs of the helical wires 10, any of which valleys serve as races 21 in which the bearing balls 19 may roll. Hence, it is evident that the new casing defines suitable bearing races of long pitch on its inside surface and eliminates the need for separate race elements in the cable.

To locate the bearing balls 19 properly within the cable, a plurality of cages 23 are provided which consist of separate lengths of tubing loosely fitted about the core element 17 and within the helical wires 10. Each cage 23 has four uniformly spaced radial holes 25 formed in its wall to receive loosely a corresponding number of bearing balls 19. When the core element 17 is axially displaced during operation, the bearing balls 19 roll along its surface and therefore roll along the races 21 also. The cages 23 are abutted end-to-end throughout most of the cable length, allowing only enough freedom at the cable ends (FIG. 2) for the desired travel. Since the races 21 are helical in form, the bearing balls 19 roll in a helical path and impart limited rotation to each cage 23, thereby reducing the extent to which the cages are axially displaced during actuation of the core element 17.

Referring to FIGS. 4 and 5, this embodiment of the new push-pull cable is made up of a multiplicity of long-lay wires assembled helically in tubular form as in the previous embodiment. However, round wires 30 alternate side-by-side with wires 31 of configured cross section. Each configured wire 31 is spaced further apart from the axis of the casing than its neighboring pair of round wires 30 and includes opposed concave shoulder portions 32 in surface-to-surface engagement with the respective opposed convex surfaces of the neighboring pair of round wires 30. The inner and outer surfaces of the configured wires 31 are defined by flats 33 and 34 respectively, the former being inside and the latter being outside a circle which would join the centers of the round wires 30. This form of the configured wires 31 provides a key-stone effect which contributes to the self-support of the long-lay wires in their tubular form. At the same time, and more importantly, it provides particularly deep valleys between adjacent pairs of the round wires 30 which can serve as helical bearing races as described below.

Wrapped about the long-lay casing wires 30 and 31 is a single flat binding wire 36 which holds the wires 30 and 31 in their tubular form. The convolutions of the flat binding wire 36 should be spaced apart slightly to add to the flexibility of the casing. To render the casing wall waterproof, a sheath of polyethylene 37 is extruded about the flat wire 36 and the exposed portions of the helical wires 30 and 31 throughout the length of the casing. Suitable end fittings may be provided at the opposite ends of the casing.

A core element 39 extends throughout the length of the casing and it should be sufficiently stiff to transmit a compressive force without buckling. A heavy flexible round wire serves well for this purpose. In rolling engagement with the surface of the core element 17 are a multiplicity of bearing balls 40 having a diameter such that they are also in rolling engagement with certain of the adjacent pairs of round wires 30. In this manner, the bearing balls 40 roll in the helical bearing races of long pitch which are formed throughout the inner bore of the casing. Because of the cross sectional shape of the configured wires 31 described previously, the bearing balls 40 do not engage them, but instead roll against adjacent pairs of the round wires 30 in a valley or race of particular depth. If there is any tendency in the embodiment of FIGS. 1 to 3 for the bearing balls to roll out of the valleys defined by adjoining pairs of round wires, this form of FIGS. 4 and 5 is preferable because the depth of the valleys which it provides insures that the bearing balls will never roll inadvertently out of their intended helical races.

A plurality of separate substantially cylindrical cages 42 and spacers 43 are disposed loosely about the core element 39 within the inner bore of the casing. Each of the cages 42 is formed with four circumferentially spaced holes 44 in which respective bearing balls 40 are loosely located. Since the cages 42 and spacers 43 have a cumulative length substantially equal to that of the inner bore of the casing less the free travel which must be allowed to them during displacement of the core element 39, there is a tendency in long cables of this type for the cages 42 and the spacers 43 to abut one another end-to-end for a substantial distance. In view of this fact, each of the cages 42 is formed at its opposite ends with convex joint portions 45 and each of the spacers 43 is formed at its opposite ends with concave joint portions 46. The convex and concave portions 45 and 46 mate with one another to permit of angular movement between adjoining cages 42 and spacers 43 without substantial displacement of their neutral bending and geometric axes. Absent this ball-and-socket type of joint, cages and spacers with ordinary faced-off ends would move angularly with respect to one another only by pivoting at a point of engagement at their edges remote from the center of the assembly, which throughout a long casing would cause the abutting cages and spacers to lengthen appreciably with respect to the core element therewithin. The effort wasted in so displacing all of the cages and spacers is eliminated entirely by the concave and convex mating ends of these elements shown in FIG. 4 which can accommodate universal angular or bending motion by pivoting with respect to each other on the geometric axis of the assembly.

These concave and convex mating joint portions are applicable to various types of push-pull cable assemblies equipped with bearing means other than those shown herein. For example, such opposed concave and convex portions may be formed at the respective opposite ends of each of the cages 42 so that one cage can abut the next in the ball-and-socket fashion described without the use of spacers 43 between the cages. Also, bearing means other than the balls 40 may be contained by the cages, or by cages and spacers, equipped with these mating joints for reducing friction when the core element is translated. Various forms of race means, or none at all, may be provided in association with such modified bearing means other than the helical races described previously. It should be understood, therefore, that this invention includes within its scope the sub-assembly of ball-and-socket type joints defined by convex and concave engageable end portions of the push-pull cable elements which hold apart the various bearing means, since such a sub-assembly proves advantageous in a variety of structural environments other than those specifically disclosed.

I claim:

1. In a push-pull cable comprising a casing and a core element axially translatable therewithin in rolling engagement with a plurality of bearing balls inside said casing, the improvement which comprises a multiplicity of helically disposed wires bound together side-by-side throughout their length and defining the inner bore of said casing, every other one of said wires being spaced closer to the axis of the casing than the wires alongside it, a plurality of helical bearing races being formed throughout the length of the bore of said casing by the respective adjacent pairs of those wires spaced closer to the axis of the casing, said bearing balls in rolling engagement with said core element also being in rolling engagement with certain of said helical bearing races, whereby the bearing balls roll in a helical path as said core element is translated within said casing.

2. A push-pull cable according to claim 1 wherein the wires are of alternately round and configured cross sections, the round wires being those spaced closer to the axis of the casing and defining said races.

3. A push-pull cable according to claim 2 wherein each configured wire includes opposed concave shoulder portions in surface-to-surface engagement across the respective opposed convex surfaces of the neighboring pair of round wires.

4. A push-pull cable according to claim 1 wherein said wires are bound together in tubular form and have a lay at least fifteen times greater than the outer diameter of that tubular form.

5. A push-pull cable according to claim 1 wherein a plurality of separate axially movable cage means engageable end-to-end are located inside said casing and space apart groups of said bearing balls along said core element, the respective engageable ends of each adjacent pair of said separate cage means comprising mating convex and concave joint portions.

References Cited by the Examiner

UNITED STATES PATENTS

| | | | |
|---|---|---|---|
| 2,457,910 | 1/1949 | McLaren et al. | 74—501 |
| 3,135,132 | 6/1964 | Bratz | 74—501 |
| 3,145,065 | 8/1964 | Cator | 308—6 |

FOREIGN PATENTS

| | | |
|---|---|---|
| 339,757 | 4/1904 | France. |
| 442,213 | 1/1936 | Great Britain. |
| 327,168 | 2/1958 | Switzerland. |

MILTON KAUFMAN, *Primary Examiner.*

BROUGHTON G. DURHAM, *Examiner.*

CAROLYN F. GREEN, *Assistant Examiner.*